US009385494B2

(12) United States Patent
Feng

(10) Patent No.: US 9,385,494 B2
(45) Date of Patent: Jul. 5, 2016

(54) POWER EXTENDING BOARD AND POWER SUPPLY SYSTEM USING SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Jun-Yang Feng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 434 days.

(21) Appl. No.: 14/067,880

(22) Filed: Oct. 30, 2013

(65) Prior Publication Data

US 2014/0175889 A1 Jun. 26, 2014

(30) Foreign Application Priority Data

Dec. 22, 2012 (CN) .......................... 2012 1 0561785

(51) Int. Cl.

| | |
|---|---|
| ***H01B 7/30*** | (2006.01) |
| ***H01B 11/02*** | (2006.01) |
| ***H02B 1/20*** | (2006.01) |
| ***H02G 5/06*** | (2006.01) |
| ***H01R 31/06*** | (2006.01) |
| ***H01R 29/00*** | (2006.01) |

(52) U.S. Cl.
CPC .............. *H01R 31/065* (2013.01); *H01R 29/00* (2013.01); *Y10T 307/707* (2015.04)

(58) Field of Classification Search
CPC .............................. H01R 31/065; H01R 29/00
USPC .......................................................... 307/147
See application file for complete search history.

(56) References Cited

U.S. PATENT DOCUMENTS 6,909,649 B2 * 6/2005 Honjou .............. G01R 31/2856 365/201

* cited by examiner

*Primary Examiner* — Carlos Amaya
(74) *Attorney, Agent, or Firm* — ScienBiziP, P.C.

(57) ABSTRACT

A power supply system includes a power source and a power extending board detachably connected between the power source and an electronic device. The power source includes at least two outputs. The power extending board includes at least two first transmitting terminals and a second transmitting terminal connected to the two first transmitting terminals. Each of the two outputs transmits a first driving voltage from the power source to the second transmitting terminal via a corresponding first transmitting terminal. The first driving voltages from the power source are identical to each other. The second transmitting terminal transmits a second driving voltage to the electronic device. The second driving voltage is identical to each of the first driving voltages.

10 Claims, 1 Drawing Sheet

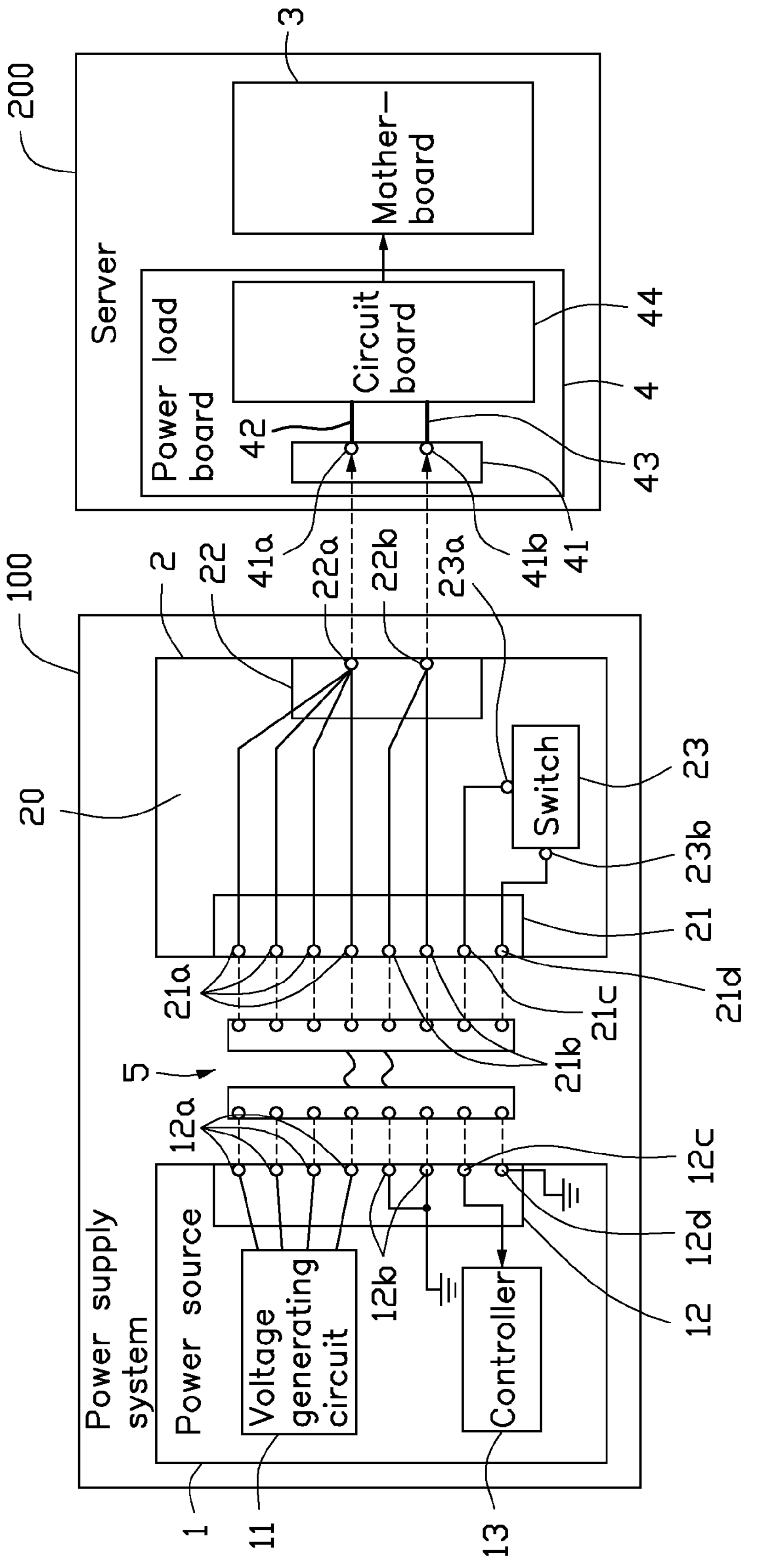
Server
Mother-
board
Circuit
board
Power load
board
Power supply
system
Power source
Voltage
generating
circuit
Controller
Switch
200
3
44
4
43
41
41b
42
41a
22a
22b
23a
100
2
22
20
23
23b
21
21d
21c
21a
21b
5
12a
12c
12d
12
12b
1
11
13

POWER EXTENDING BOARD AND POWER SUPPLY SYSTEM USING SAME

BACKGROUND

1. Technical Field

The present disclosure relates to a power extending board and a power supply system using the power extending board.

2. Description of Related Art

To test an electronic device after the electronic device is manufactured, a power supply is employed to supply power to a motherboard of the electronic device via a power load board connected to the motherboard.

However, because the power consumed by the motherboard is more than power consumed by other components of the electronic device, and only a cable is configured to transmit the power from the power supply to the motherboard, too much current may pass through the cable. As a result, the first cable may melt, thereby affecting testing of the electronic device.

Therefore, what is needed is a way to overcome the described limitations.

BRIEF DESCRIPTION OF THE DRAWINGS

The FIGURE is a structural schematic diagram illustrating one embodiment of a power supply system according to the present disclosure.

DETAILED DESCRIPTION

The disclosure is illustrated by way of example and not by way of limitation in the figures of the accompanying drawings in which like references indicate similar elements. It should be noted that references to “an” or “one” embodiment in this disclosure are not necessarily to the same embodiment, and such references mean “at least one.”

Reference will now be made to the drawing to describe specific exemplary embodiments of the present disclosure.

In order to express electrical connections between electronic components clearly, broken lines are used to designate plug connections between two connectors or two power interfaces, and solid lines are used to designate electrical connections between other electrical components in the FIGURE. In the FIGURE, a server 200 is described as an example of an electronic device. However, the electronic device is not limited to the server 200, but may be other devices that require a power supply to operate.

The FIGURE shows one embodiment of a power supply system 100 according to the present disclosure. The power supply system 100 is configured to supply power to the server 200 to test the server 200. The power supply system 100 includes a power source 1, a power extending board 2, and a data line 5. The server 200 includes a motherboard 3 and a power load board 4 connected to the motherboard 3. The power extending board 2 is detachably connected to the power source 1 via the data line 5. The power extending board 2 is further detachably connected to the power load board 4.

The power extending board 2 receives four first driving voltages and four first driving currents corresponding to the four first driving voltages one-to-one from the power source 1 via four parallel transmitting paths, and outputs a second driving voltage and a second driving current to the power load board 4 corresponding to the first driving voltages and the first driving currents. The four first driving voltages are direct current (DC) voltages. The four first driving voltages are identical to each other, and the four first driving currents are identical to each other. The second driving voltage equals each of the first driving voltages. The second driving current equals a sum of the four first driving currents. In alternative embodiments, the power source 1 may output two, three, or more driving voltages and driving currents to the power extending board 2. The power load board 4 receives the second driving voltage and the second driving current, adjusts the second driving voltage and the second driving current, and outputs the adjusted second driving voltage and the adjusted second driving current to the motherboard 3. The motherboard 3 operates based on the adjusted second driving voltage and the adjusted second driving current.

The power extending board 2 includes a support plate 20, a first connector 21, a second connector 22, and a switch 23. The first connector 21, the second connector 22, and the switch 23 are located on the support plate 20. The first connector 21 includes four first transmitting terminals 21*a,* two first ground terminals 21*b,* a control terminal 21*c,* and a second ground terminal 21*d.* The switch 23 includes a first end 23*a* and a second end 23*b.* The second connector 22 includes a second transmitting terminal 22*a* and a third ground terminal 22*b.* The four first transmitting terminals 21*a* are connected to the second transmitting terminal 22*a.* The two first ground terminals 21*b* are connected to the third ground terminal 22*b.* The control terminal 21*c* is connected to the first end 23*a.* The second ground terminal 21*d* is connected to the second end 23*b.* The switch may be a single-pole single-throw switch, for example.

The power source 1 includes a voltage generating circuit 11, a third connector 12, and a controller 13. The voltage generating circuit 11 generates the four first driving voltages and the four first driving currents. The third connector 12 includes four outputs 12*a,* two fourth ground terminals 12*b,* a control terminal 12*c,* and a fifth ground terminal 12*d.* The four outputs 12*a* are connected to the voltage generating circuit 11. Each of the four outputs 12*a* outputs a first driving voltage and a first driving current from the voltage generating circuit 11. The two fourth ground terminals 12*b* and the fifth ground terminal 12*d* are connected to ground. The control terminal 12*c* is connected to the controller 13. The controller 13 controls whether the power source 1 supplies power to the server 200 based on a voltage applied on the control terminal 12*c.*

The first connector 21 is detachably connected to the third connector 12 via the data line 5. Correspondingly, the four outputs 12*a* are connected to the four first transmitting terminals 21*a* one-to-one. The two first ground terminals 21*b* are connected to the two fourth ground terminals 12*b* one-to-one. The control terminal 21*c* is connected to the control terminal 12*c.* The second ground terminal 21*d* is connected to the fifth ground terminal 12*d.*

The power load board 4 includes a fourth connector 41, a first cable 42, a second cable 43, and a circuit board 44. The fourth connector 41 includes an input 41*a* and a sixth ground terminal 41*b.* The input 41*a* is connected to the circuit board 44 via the first cable 42. The sixth ground terminal 41*b* is connected to the circuit board 44 via the second cable 43. In addition, the fourth connector 41 is plugged into the second connector 22. Correspondingly, the input 41*a* is connected to the second transmitting terminal 22*a.* The sixth ground terminal 41*b* is connected to the third ground terminal 22*b.* The first cable 42 and the second cable 43 may be thick cables, for example. Thus, the first cable 42 and the second cable 43 are capable of transmitting larger currents.

Operation of the power supply system 100 is as follows.

When the server 200 is tested, the switch 23 is switched on by a user, such that the power source 1 supplies power to the server 200. The control terminal 21*c* is connected to the second ground terminal 21*d* through the switch 23. The control terminal 12*c* is connected to ground via the fifth ground terminal 21*d*, the second ground terminal 21*d*, and the control terminal 21*c*. The voltage applied to the control terminal 12*c* is 0 volts (V). The controller 13 correspondingly controls the power source 1 to operate based on the voltage of the control terminal 12*c*.

The voltage generating circuit 11 generates the four first driving voltages and the four first driving currents, and outputs the four first driving voltages and the four first driving currents to the four first transmitting terminals 21*a* via the four outputs 12*a*. Each of the four first transmitting terminals 21*a* transmits a first driving voltage and a first driving current to the second transmitting terminal 22*a*. The second transmitting terminal 22*a* outputs the second driving voltage and the second driving current to the input 41*a* of the power load board 4 based on the four first driving voltages and the four first driving currents. As described above, the second driving voltage equals each of the four first driving voltages, and the second driving current equals the sum of the four first driving currents.

The input 41*a* transmits the second driving voltage and the second driving current to the circuit board 44 via the first cable 42. The circuit board 44 adjusts the second driving voltage and the second driving current and outputs the adjusted second driving voltage and the second driving current to the motherboard 3, so as to supply power to the motherboard 3.

After the server 200 is tested, the switch 23 is switched off by the user. As a result, the control terminal 12*c* is floated instead of connecting to ground via the fifth ground terminal 12*d*, and the voltage applied to the control terminal 12*c* does not equal 0V. The controller 13 controls the power source 1 to stop supplying power to the server 200 based on the voltage of the control terminal 12*c*.

Since the power supply system 100 includes the power extending board 2 connected between the power source 1 and the server 200, and since the power extending board 2 includes four transmitting paths for transmitting the four first driving voltages and the four first driving currents, each of the four first driving currents is reduced. Accordingly, the test of the server 200 after the server 200 is manufactured can be carried out smoothly.

In alternative embodiments, the data line 5, the first connector 21, the second connector 22, the third connector 12, and the fourth connector 41 can be omitted, such that the four first transmitting terminals 21*a*, the two first ground terminals 21*b*, the control terminal 21*c*, the second ground terminal 21*d*, the second transmitting terminal 22*a*, and the third ground terminal 22*b* are directly formed on the power extending board 2, the four outputs 12*a*, the two fourth ground terminals 12*b*, the control terminal 12*c*, and the fifth ground terminal 12*d* are directly formed on the power source 1, and the input 41*a* and the sixth ground terminal 41*b* are directly formed on the power load board 4. Leads are used to connect the power extending board 2 between the power source 1 and the power load board 4 via soldering.

It is believed that the present embodiments and their advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A power extending board, comprising:

at least two first transmitting terminals configured to detachably connect to at least two outputs of a power source and receive first driving voltages from the power source via the at least two outputs, the first driving voltages being identical, each of the at least two first transmitting terminals outputting a first driving voltage;

a first grounded terminal configured to connect to ground via a first ground terminal of the power source;

a second transmitting terminal connected to the at least two first transmitting terminals, and configured to connect to an input of an electronic device, the second transmitting terminal receiving the first driving voltages from the at least two first transmitting terminals, and outputting a second driving voltage to the electronic device via the input, the second driving voltage being identical with each of the first driving voltages; and a second ground terminal connected to the first ground terminal of the power extending board, and configured to connect to a ground terminal of the electronic device.

2. The power extending board of claim 1, further comprising a switch, wherein the switch comprises a first end and a second end; the first end is configured to connect to ground via a second ground terminal of the power source, and the second end is configured to connect to a control terminal of the power source; the switch controls whether the power source supplies the first driving voltages to the electronic device, by controlling whether the control terminal is connected to the second ground terminal of the power source.

3. The power extending board of claim 2, further comprising a first connector, wherein the first connector comprises the at least two transmitting terminals and the first ground terminal of the power extending board, the at least two transmitting terminals are connected to the at least two outputs of the power source, and the first ground terminal of the power extending board is connected to the first ground terminal of the power source, by plugging the first connector into a connector of the power source.

4. The power extending board of claim 3, wherein the first connector further comprises a control terminal and a third ground terminal; the first end of the switch is connected to the control terminal of the first connector, and the second end of the switch is connected to the third ground terminal; the control terminal of the first connector is further connected to the control terminal of the power source, and the third ground terminal is connected to the second ground terminal of the power source, by plugging the first connector into the connector of the power source.

5. The power extending board of claim 4, further comprising a second connector, wherein the second connector comprises the second transmitting terminal and the second ground terminal, the second transmitting terminal is connected to the input of the electronic device, and the second ground terminal is connected to the ground terminal of the electronic device.

6. A power supply system configured to supply power to an electronic device, comprising:

a power source comprising:

a voltage generating circuit generating at least two first driving voltages, the at least two first driving voltages being identical;

at least two outputs connected to the voltage generating circuit, each of the at least two outputs outputting a first driving voltage;

a first ground terminal connected to ground; and a second ground terminal connected to ground; and a power extending board detachably connect between the power source and the electronic device, the power extending board comprising:

at least two first transmitting terminals connected to the at least two outputs of the power source and receiving the first driving voltages from the power source via the at least two outputs, each of the at least two first transmitting terminals outputting a first driving voltage;

a first grounded terminal connected to the first ground terminal of the power source;

a second transmitting terminal connected to the at least two first transmitting terminals, and configured to connect to an input of the electronic device, the second transmitting terminal receiving the first driving voltages from the at least two first transmitting terminals, and outputting a second driving voltage to the electronic device via the input, the second driving voltage being identical with each of the first driving voltages; and a second ground terminal connected to the first ground terminal of the power extending board, and configured to connect to a ground terminal of the electronic device.

7. The power supply system of claim 6, wherein the power source further comprises a controller and a control terminal connected to the controller; the power extending board further comprises a switch; the switch comprises a first end and a second end; the first end is the second ground terminal of the power source, and the second end is connected to the control terminal of the power source; whether the first end is connected to the second end by controlling the switch-on and the switch-off of the switch; the controller controls whether the power source supplies the first driving voltages to the electronic device, by controlling the switch.

8. The power supply system of claim 7, wherein the power extending board further comprises a first connector; the first connector comprises the at least two transmitting terminals and the first ground terminal of the power extending board; the at least two transmitting terminals are connected to the at least two outputs of the power source, and the first ground terminal of the power extending board is connected to the first ground terminal of the power source, by plugging the first connector into a connector of the power source.

9. The power supply system of claim 8, wherein the first connector further comprises a control terminal and a third ground terminal; the first end of the switch is connected to the control terminal of the first connector, and the second end of the switch is connected to the third ground terminal; the control terminal of the first connector is further connected to the control terminal of the power source, and the third ground terminal is connected to the second ground terminal of the power source, by plugging the first connector into the connector of the power source.

10. The power supply system of claim 9, wherein the power extending board further comprises a second connector; the second connector comprises the second transmitting terminal and the second ground terminal; the second transmitting terminal is connected to the input of the electronic device, and the second ground terminal is connected to the ground terminal of the electronic device.

* * * * *